United States Patent
Minemura et al.

(10) Patent No.: US 9,150,223 B2
(45) Date of Patent: Oct. 6, 2015

(54) COLLISION MITIGATION APPARATUS

(71) Applicants: DENSO CORPORATION, Kariya, Aichi-pref. (JP); Toyota Jidosha Kabushiki Kaisha, Toyota-shi, Aichi-ken (JP)

(72) Inventors: Akitoshi Minemura, Nishio (JP); Norio Tsuchida, Kariya (JP); Akira Isogai, Kuwana (JP); Jun Tsuchida, Toyota (JP); Masayuki Shimizu, Toyota (JP)

(73) Assignees: DENSO CORPORATION, Kariya, Aichi-pref. (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/276,201

(22) Filed: May 13, 2014

(65) Prior Publication Data
US 2014/0343750 A1 Nov. 20, 2014

(30) Foreign Application Priority Data
May 14, 2013 (JP) .................................. 2013-102315

(51) Int. Cl.
G01C 22/00 (2006.01)
B60W 50/04 (2006.01)
(Continued)

(52) U.S. Cl.
CPC ...... *B60W 50/04* (2013.01); *B60T 7/22* (2013.01); *B60W 30/085* (2013.01); *B60W 30/09* (2013.01);
(Continued)

(58) Field of Classification Search
CPC .... B60W 50/04; G08G 1/161; H04W 76/002; H04W 4/046; H04W 4/06; H04W 76/023

USPC ............ 701/1, 301, 23, 24, 27; 340/903, 436, 340/455; 180/271, 274
See application file for complete search history.

(56) References Cited

U.S. PATENT DOCUMENTS

2005/0107955 A1* 5/2005 Isaji et al. ................... 701/301
2006/0173621 A1* 8/2006 Stopczynski ................ 701/301
(Continued)

FOREIGN PATENT DOCUMENTS

DE   10 2011 010 864   12/2011
DE   10 2011 108 865   1/2012
(Continued)

OTHER PUBLICATIONS

Extended European Search Report dated Sep. 17, 2014 in corresponding EP Application No. 14166948.1.
(Continued)

*Primary Examiner* — Helal A Algahaim
*Assistant Examiner* — Shardul Patel
(74) *Attorney, Agent, or Firm* — Harness, Dickey & Pierce, P.L.C.

(57) ABSTRACT

A collision mitigation apparatus includes an object detecting section for detecting a collision object present in front of an own vehicle on which the collision mitigation apparatus is mounted, a drive assisting section that performs drive assist for avoiding a collision between the collision object detected by the object detecting section and the own vehicle, or mitigate damage to the own vehicle due to the collision, a reliability determining section for determining reliability of detection result of the object detecting section, and a timing setting section for setting start timing to start the drive assist by the drive assisting section in accordance with the reliability determined by the reliability determining section.

14 Claims, 9 Drawing Sheets

(51) Int. Cl.
*B60T 7/22* (2006.01)
*B60W 30/09* (2012.01)
*B60W 30/095* (2012.01)
*B60W 30/085* (2012.01)
*B60W 50/02* (2012.01)

(52) U.S. Cl.
CPC ........ B60W 30/095 (2013.01); *B60T 2201/024* (2013.01); *B60W 2050/0215* (2013.01); *B60W 2420/42* (2013.01); *B60W 2420/52* (2013.01)

(56) References Cited

U.S. PATENT DOCUMENTS

| | | | |
|---|---|---|---|
| 2007/0168128 A1 | 7/2007 | Tokoro et al. | |
| 2007/0286475 A1 | 12/2007 | Sekiguchi | |
| 2008/0269997 A1* | 10/2008 | Ezoe et al. | 701/70 |
| 2008/0319670 A1* | 12/2008 | Yopp et al. | 701/301 |
| 2009/0037055 A1* | 2/2009 | Danner et al. | 701/45 |
| 2009/0248270 A1* | 10/2009 | Sekiguchi | 701/96 |
| 2010/0082251 A1* | 4/2010 | Kogure | 701/301 |
| 2012/0116665 A1* | 5/2012 | Aoki et al. | 701/301 |
| 2013/0261951 A1* | 10/2013 | Sekiguchi et al. | 701/301 |
| 2014/0032093 A1* | 1/2014 | Mills | 701/301 |

FOREIGN PATENT DOCUMENTS

| | | |
|---|---|---|
| DE | 10 2012 000 896 | 8/2012 |
| DE | 10 2012 014 624 | 1/2013 |
| JP | 2005-158012 | 6/2005 |
| JP | 2005-239114 | 9/2005 |
| JP | 2006-099715 | 4/2006 |
| JP | 2007-310741 | 11/2007 |
| JP | 2012-048643 | 3/2012 |

OTHER PUBLICATIONS

Office Action dated Mar. 31, 2015 in corresponding Japanese Application No. 2013-102315.

* cited by examiner

FIG.7

<table>
<tr><th colspan="2"></th><th colspan="8">DRIVE ASSIST OBJECT</th></tr>
<tr><th colspan="2"></th><th colspan="4">STATIONARY OBJECT</th><th colspan="2">PRECEDING OBJECT</th><th colspan="2">ONCOMING OBJECT</th></tr>
<tr><th colspan="2"></th><th>VEHICLE</th><th>PEDESTRIAN</th><th>OTHERS</th><th>CROSSING</th><th>VEHICLE</th><th>PEDESTRIAN</th><th>VEHICLE</th><th>PEDESTRIAN</th></tr>
<tr><td colspan="2">BASE TABLE</td><td>A-1</td><td>B-1</td><td>C-1</td><td>D-1</td><td>E-1</td><td>F-1</td><td>G-1</td><td>H-1</td></tr>
<tr><td rowspan="9">DETECTION RELIABILITY</td><td>RELIABILITY RANK 1</td><td>A-2</td><td>B-2</td><td>C-2</td><td>D-2</td><td>E-2</td><td>F-2</td><td>G-2</td><td>H-2</td></tr>
<tr><td>RELIABILITY RANK 2</td><td>A-3</td><td>B-3</td><td>C-3</td><td>D-3</td><td>E-3</td><td>F-3</td><td>G-3</td><td>H-3</td></tr>
<tr><td>RELIABILITY RANK 3</td><td>A-4</td><td>B-4</td><td>C-4</td><td>D-4</td><td>E-4</td><td>F-4</td><td>G-4</td><td>H-4</td></tr>
<tr><td>RELIABILITY RANK 4</td><td>A-5</td><td>B-5</td><td>C-5</td><td>D-5</td><td>E-5</td><td>F-5</td><td>G-5</td><td>H-5</td></tr>
<tr><td>RELIABILITY RANK 5</td><td>A-6</td><td>B-6</td><td>C-6</td><td>D-6</td><td>E-6</td><td>F-6</td><td>G-6</td><td>H-6</td></tr>
<tr><td>RELIABILITY RANK 6</td><td>A-7</td><td>B-7</td><td>C-7</td><td>D-7</td><td>E-7</td><td>F-7</td><td>G-7</td><td>H-7</td></tr>
<tr><td>RELIABILITY RANK 7</td><td>A-8</td><td>B-8</td><td>C-8</td><td>D-8</td><td>E-8</td><td>F-8</td><td>G-8</td><td>H-8</td></tr>
<tr><td>RELIABILITY RANK 8</td><td>A-9</td><td>B-9</td><td>C-9</td><td>D-9</td><td>E-9</td><td>F-9</td><td>G-9</td><td>H-9</td></tr>
<tr><td>...</td><td>...</td><td>...</td><td>...</td><td>...</td><td>...</td><td>...</td><td>...</td><td>...</td></tr>
<tr><td rowspan="2">VEHICLE STATE</td><td>RELATIVE SPEED ≥ X</td><td>A-10</td><td>B-10</td><td>C-10</td><td>D-10</td><td>E-10</td><td>F-10</td><td>G-10</td><td>H-10</td></tr>
<tr><td>...</td><td>...</td><td>...</td><td>...</td><td>...</td><td>...</td><td>...</td><td>...</td><td>...</td></tr>
<tr><td rowspan="3">RUNNING ENVIRONMENT</td><td>CURVE AHEAD</td><td>A-11</td><td>B-11</td><td>C-11</td><td>D-11</td><td>E-11</td><td>F-11</td><td>G-11</td><td>H-11</td></tr>
<tr><td>WHITE LINE RECOGNIZED</td><td>A-12</td><td>B-12</td><td>C-12</td><td>D-12</td><td>E-12</td><td>F-12</td><td>G-12</td><td>H-12</td></tr>
<tr><td>...</td><td>...</td><td>...</td><td>...</td><td>...</td><td>...</td><td>...</td><td>...</td><td>...</td></tr>
</table>

COLLISION MITIGATION APPARATUS

This application claims priority to Japanese Patent Application No. 2013-102315 filed on May 14, 2013, the entire contents of which are hereby incorporated by reference.

BACKGROUND OF THE INVENTION

1. Field of the Invention

The present invention relates to a collision mitigation apparatus for avoiding collision of a vehicle or mitigating collision damage to the vehicle.

2. Description of Related Art

There is known a collision mitigation apparatus which detects a collision object present around a vehicle using a sensor such as a camera or a radar, and performs drive assist to avoid collision with the collision object or mitigate damage to the vehicle due to collision with the collision object. Such a collision apparatus has a problem in that, if detection reliability of the sensor is lowered due to the weather, ambient brightness, and the like, a collision object may be falsely detected, causing drive assist to be performed unnecessarily.

Japanese Patent Application Laid-open No. 2012-48643 describes an object detection apparatus configured to perform drive assist only when reliability of detection of a collision object by a sensor being used is assumed to be high, to prevent drive assist from being performed unnecessarily.

However, there is a chance that the sensor detects an object correctly even when the detection reliability is assumed to be low.

SUMMARY

An exemplary embodiment provides a collision mitigation apparatus including:

an object detecting section for detecting a collision object present in front of an own vehicle on which the collision mitigation apparatus is mounted;

a drive assisting section that performs drive assist for avoiding a collision between the collision object detected by the object detecting section and the own vehicle, or mitigating damage to the own vehicle due to the collision;

a reliability determining section for determining a reliability of a detection result of the object detecting section; and a timing setting section for setting start timing to start the drive assist by the drive assisting section in accordance with the reliability determined by the reliability determining section.

According to the exemplary embodiment, there is provided a collision mitigation apparatus capable of suppressing unnecessary drive assist from being performed without preventing necessary drive assist from being performed.

Other advantages and features of the invention will become apparent from the following description including the drawings and claims.

BRIEF DESCRIPTION OF THE DRAWINGS

In the accompanying drawings:

FIG. 7 is a diagram showing an example of a TTC map;

PREFERRED EMBODIMENTS OF THE INVENTION

Figure 1:
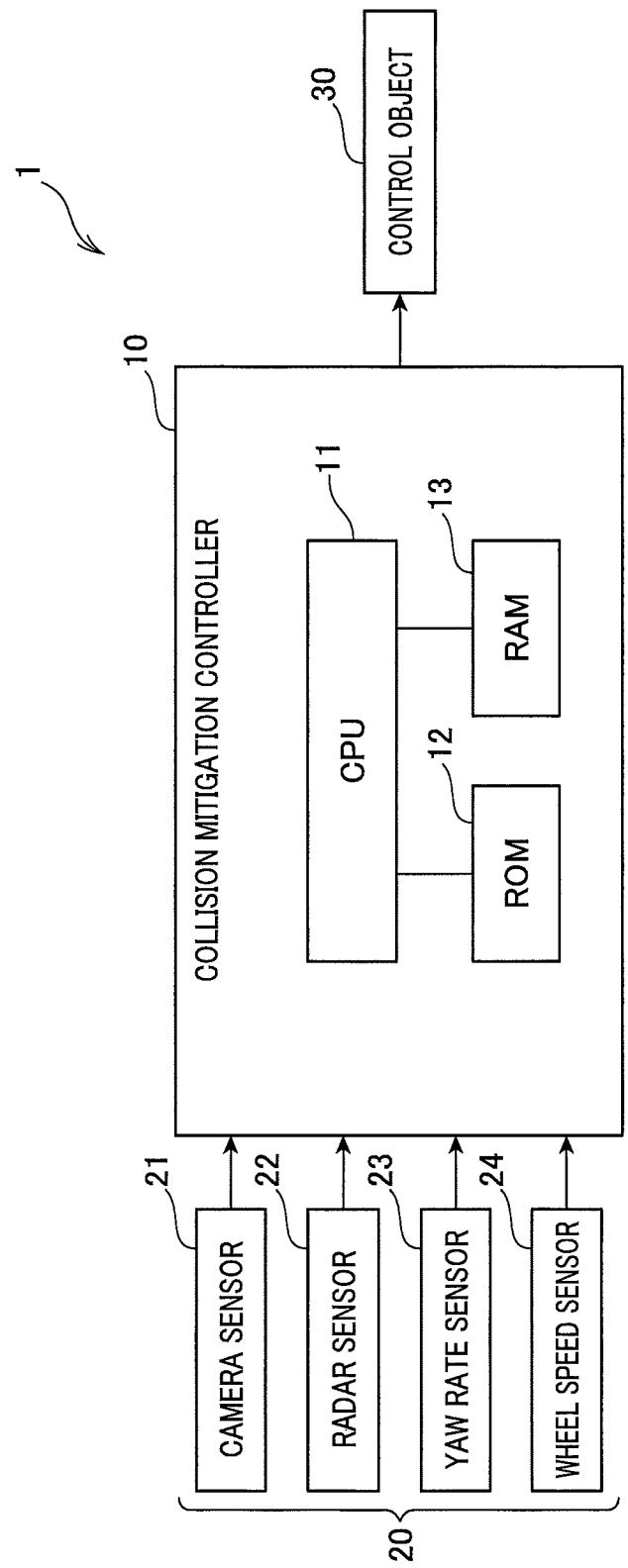
FIG. 1 is a block diagram showing the structure of a PCS (precrash safety system) as a collision mitigation apparatus according to an embodiment of the invention.

A PCS (precrash safety system) 1 as a collision mitigation apparatus according to an embodiment of the invention is a system mounted on a vehicle (may be referred to as the own vehicle hereinafter) to avoid collision of the own vehicle or mitigate collision damage to the own vehicle by performing drive assists such as giving a warning or actuating a brake device if there is a high risk of collision between the own vehicle and a collision object. The PCS 1 includes a collision mitigation controller 10, various sensors 20 and a control object 30 (see FIG. 1).

The sensors 20 include a camera sensor 21, a radar sensor 22, a yaw-rate sensor 23 and a wheel speed sensor 24. The camera sensor 21 is a stereo camera capable of range finding in this embodiment so that the shape of and the distance to a collision object such as a pedestrian, an on-road obstacle or a vehicle can be recognized based on taken images.

The radar sensor 22 emits a directional electromagnetic wave toward a collision object, and receives a reflected version of the directional electromagnetic wave to recognize the position of the collision object relative to the own vehicle together with its shape and size. The camera sensor 21 and/or the radar sensor 22 define an object detecting unit.

The yaw-rate sensor 23 detects the turning angular velocity of the own vehicle. The wheel speed sensor 24 detects the wheel rotational speed as the speed of the own vehicle.

Detection results of these sensors 20 are received by the collision mitigation controller 10. Incidentally, each of the camera sensor 21 and the radar sensor 22 performs a process for detecting a collision object present in front of the own vehicle at a predetermined period (100 ms, for example).

The collision mitigation controller 10 includes a CPU 11, a ROM 12 and a RAM 13. The CPU 11 of the collision mitigation controller 10 executes programs stored in the ROM 12 in accordance with the detection results received from the sensors 20, to thereby perform various processes explained later.

The collision mitigation controller 10 actuates the control object 30 depending on a result of detection of a collision object. The control object 30 may be a brake device, a steering device, an actuator for driving a seat belt device, and a warning device. The control object 30 defines a drive assisting unit.

The PCS 1 recognizes the type (vehicle, pedestrian, bike, motorbike, and so on) of a collision object in front of the own vehicle together with its relative position, relative speed, size and shape using the camera sensor 21 or the radar sensor 22.

The PCS 1 also estimates a TTC (time to collision) indicative a time remaining before collision for each detected collision object based on its relative position and relative speed. If the TTC reaches an operation threshold, the PCS 1 performs various drive assists through the control object 30, such as generation of a warning signal, actuation of the brake device, intervention to a steering operation of the vehicle driver, or tensioning of the seatbelts.

The operation threshold is variably set in accordance with the kind of a collision object, detection reliability (reliability of detection of the collision object by the camera sensor 21 or the radar sensor 22), a state of the own vehicle (the vehicle state), the running environment of the own vehicle and so on for each kind of drive assist.

Figure 2:
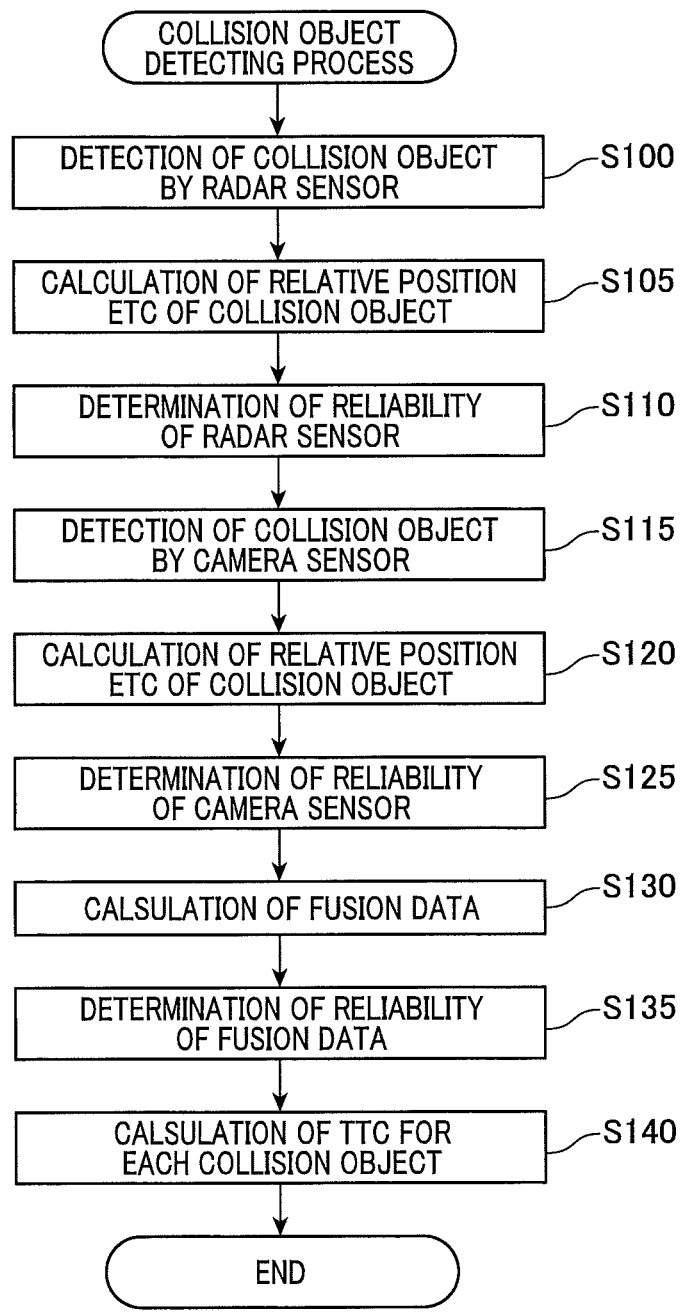
FIG. 2 is a flowchart showing steps of a collision object detecting process performed by the PCS.

The PCS 1 sets the operation threshold such that start timing to start drive assist is late when the detection reliability is low compared to when the detection reliability is high. Next, a collision object detecting process is explained with reference to the flowchart of FIG. 2. The collision object detecting process is performed periodically for detecting a collision object present in front of the own vehicle using the camera sensor 21 or radar sensor 22, and determining the detection reliability for each detected collision object.

The collision object detecting process begins in step S100 where the collision mitigation controller 10 causes the radar sensor 22 to emit directional electromagnetic waves and receive a reflected version of the directional electromagnetic waves. In subsequent step S105, the collision mitigation controller 10 detects a collision object(s) based on the received reflected version of the directional electromagnetic waves, and calculates the relative position (the distance from the own vehicle and lateral position relative to the own vehicle) of each collision object. Further, the collision mitigation controller 10 recognizes the size and shape of each collision object. Thereafter, the process proceeds to step S110.

Incidentally, if a collision object once detected has not been detected by the radar sensor 22, the collision mitigation controller 10 estimates the present relative position of this collision object by interpolation of data representing the past relative positions of this collision object, as long as the number of continuous cycles in which the radar sensor 2 failed to detect this collision object is smaller than a predetermined number.

In step S110, the collision mitigation controller 10 includes a reliability determining section that determines radar reliability (reliability of detection of a collision object by the radar sensor 22) in accordance with the intensity of the received reflected version of the directional electromagnetic wave.

In subsequent step S115, the collision mitigation controller 10 receives an image taken by the camera sensor 21, and then the process proceeds to step S120. In step S120, the collision mitigation controller 10 performs image processing on the taken image to extract an area(s) in (each of) which a collision object is present, and calculates the relative position (the distance and direction from the own vehicle) of each collision object. Further, the collision mitigation controller 10 recognizes the size and shape of each collision object, and determines the kind of each collision object by pattern matching or the like. Thereafter, the process proceeds to step S125.

Incidentally, if a collision object once detected has not been detected by the camera sensor 21, the collision mitigation controller 10 estimates the present relative position of this collision object by interpolation of data representing the past relative positions of this collision object, as long as the number of continuous frames in which the camera sensor 21 failed to detect this collision objected is smaller than a predetermined number.

In step S125, the reliability determining section of the collision mitigation controller 10 determines camera reliability (reliability of detection by the camera sensor 21) for each collision object based on tracking data indicative of the number of the past frames of the camera sensor 21, in each of which the collision object has been recognized. Alternatively, the collision mitigation controller 10 may determine the camera reliability based on the number of edges between an area where the collision object is shown and other areas in a taken image used to recognize the collision object.

Figure 3:
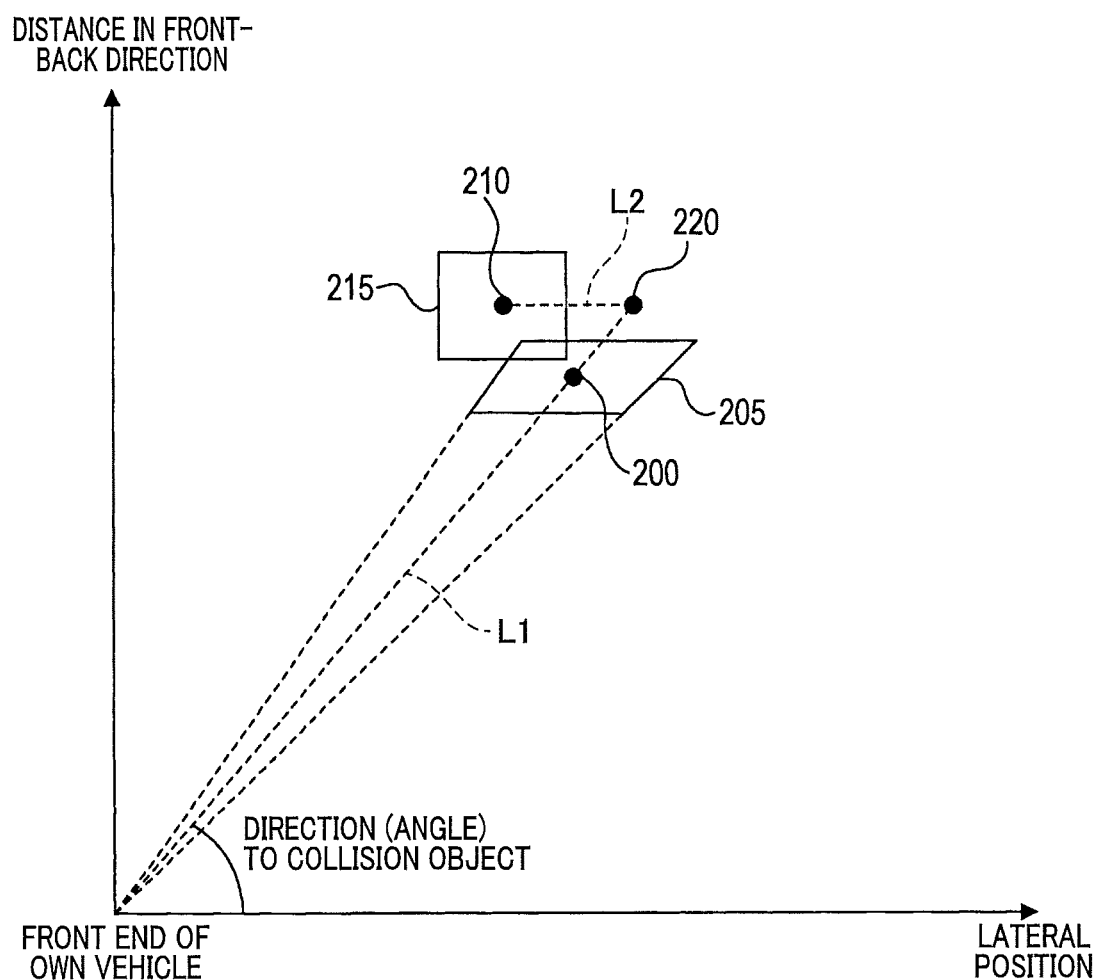
FIG. 3 is a flowchart showing steps of a method of generating fusion data performed by the PCS.

In subsequent step S130, the collision mitigation controller 10 calculates fusion data representing more accurately a relative position (referred to as the fine relative position hereinafter) of each collision object based on its relative positions detected by the radar sensor 22 and the camera sensor 21, respectively. More specifically, as shown in FIG. 3, the collision mitigation controller 10 sets a straight line L1 connecting the position of the own vehicle and the relative position 200 of a detected collision object determined from its relative distance and relative direction obtained by the camera sensor 21, and sets a straight line L2 extending laterally from the relative position 210 of the collision object determined from its relative distance and relative position obtained by the radar sensor 21. The collision mitigation controller 10 determines the intersection point of these straight lines L1 and L2 as the fine relative position of the collision object (fusion data).

Further, the collision mitigation controller 10 sets, as a radar detection area 215, a rectangular area having a predetermined size which is centered around the relative position of the collision object obtained by the radar sensor 22. Thereafter, the collision mitigation controller 10 sets a circular sector area having a predetermined central angle centered around the center of the front end of the own vehicle, the center line of the circular sector area extending to the direction of the relative position of the collision object obtained by the camera sensor 21, and sets also a band-shaped area which extends laterally and on whose center in the front-back direction the relative position of the collision object obtained by the camera sensor 21 lies. The collision mitigation controller 10 sets the overlapped portion between these two areas as a camera detection area 205.

Subsequently, the collision mitigation controller 10 calculates the area of the overlapped portion between the radar detection area 215 and the camera detection area 205. The calculated area is used to determine detection reliability of later-explained fusion data.

If a collision object has been detected by only one of the radar sensor 22 and the camera sensor 21, drive assist is carried out depending on the relative position of the collision object obtained by the radar sensor 22 or the camera sensor 21. In subsequent step S135, the collision mitigation controller 10 determines which one of reliability ranks 1 to 8 the detection reliability falls under for each collision object. The reliability rank 1 represents the highest detection reliability. The degrees of reliabilities represented by the reliability rank 1 to 8 decrease in this order as explained below.

The reliability rank 1 corresponds to a state where a collision object has been detected by both the radar sensor 22 and the camera sensor 21, the radar reliability is high and the calculated area of the overlapped portion is larger than or equal to a predetermined value.

The reliability rank 2 corresponds to a state where a collision object has been detected by the radar sensor 22 and the radar reliability is high, however, this collision object has not been detected over a predetermined number or more of the past image frames outputted from the camera sensor 21.

The reliability rank 3 corresponds to a state where a collision object has been detected by the radar sensor 22 and the radar reliability is high, however, the camera sensor 21 has lost this collision object although the calculated area of the overlapped portion was larger than or equal to the predetermined value.

The reliability rank 4 corresponds to a state where a collision object has been detected by both the radar sensor 22 and the camera sensor 21 and the calculated area of the overlapped portion is larger than or equal to the predetermined value, however, the radar reliability is low.

The reliability rank 5 corresponds to a state where a collision object has been detected by the radar sensor 22, however, the radar reliability is low and this collision object has not been detected over the predetermined number of more of the past image frames outputted from the camera sensor 21.

The reliability rank 6 corresponds to a state where a collision object has been detected by the radar sensor 22, however, the radar reliability is low and the camera sensor 21 has lost this collision object although the calculated area of the overlapped portion was larger than or equal to the predetermined value.

The reliability rank 7 corresponds to a state where a collision object has been detected by the camera sensor 21, however, this collision object has not been detected over the predetermined number or more of the past detection cycles of the radar sensor 22.

The reliability rank 8 corresponds to a state where a collision object has been detected by the camera sensor 21, however, the radar sensor 22 has lost this collision object although the calculated area of the overlapped portion was larger than or equal to the predetermined value.

The collision mitigation controller 10 determines that no collision object is detected when the detection reliability falls under none of the reliability ranks 1 to 8. In subsequent step S140, the collision mitigation controller 10 calculates the TTC for each collision object by dividing the distance between the collision object and the own vehicle by the relative speed of the collision object, for example.

Figure 4:
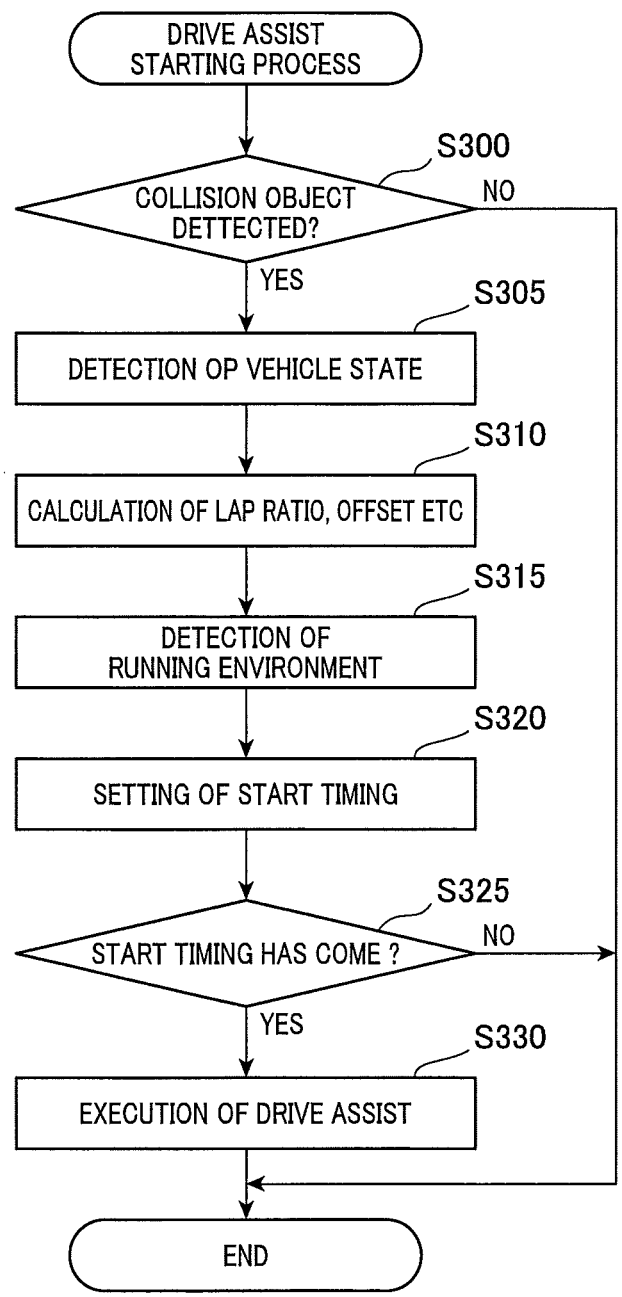
FIG. 4 is a flowchart showing steps of a drive assist starting process performed by the PCS.

Next, a drive assist starting process for setting timing to start drive assist for each collision object, and starting drive assist when the start timing has come is explained with reference to the flowchart of FIG. 4. This process is performed periodically.

The drive assist starting process begins in step S300 where the collision mitigation controller 10 determines whether or not a collision object has been detected. If the determination result in step S300 is affirmative, the process proceeds to step S305, and otherwise this process is terminated.

In step S305, the collision mitigation controller 10 includes a state detection section that detects the states of the own vehicle including the yaw rate measured by the yaw rate sensor 23 and the vehicle speed measured by the wheel speed sensor 24. Further, the collision mitigation controller 10 calculates, as the vehicle state, the relative acceleration of each collision object relative to the own vehicle using historical records of the relative speed of each collision object. Thereafter, the process proceeds to step S310.

The collision mitigation controller 10 may detect, as the vehicle state, whether the blinker of the own vehicle is in operation or whether the own vehicle is running straight. Further, the collision mitigation controller 10 may determine the vehicle state based on data received from other ECUs through a wireless LAN (not shown).

In step S310, the collision mitigation controller 10 calculates the width (lateral length) of each collision object based on the size and shape and so on of each collision object. Further, the collision mitigation controller 10 calculates a lap ratio and an offset of each collision object based on the relative position of each collision object and the kind of each object recognized by the camera sensor 21.

Figure 5:
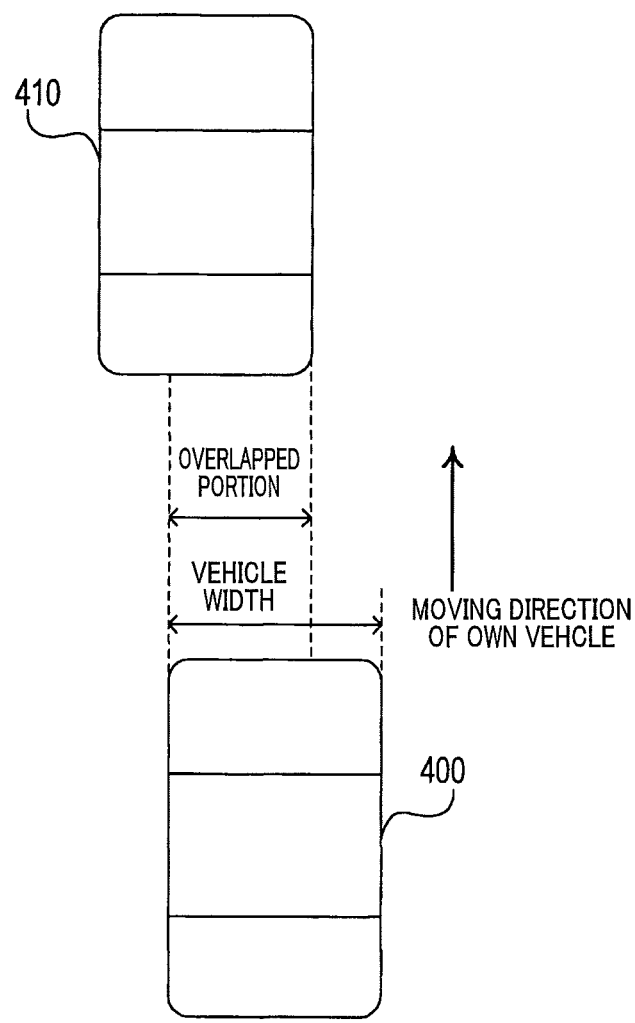
FIG. 5 is a diagram for explaining the term of "lap ratio"

Here, as shown in FIG. 5, the lap ratio is a degree by which the front end of the own vehicle 400 and the rear end of a vehicle 410 as a collision object laterally overlap with each other. More specifically, the lap ratio may be a ratio of the lateral length of the lateral overlap between the front end of the own vehicle 400 and the rear end of the vehicle 410 to the width of the own vehicle 400.

Figure 6:
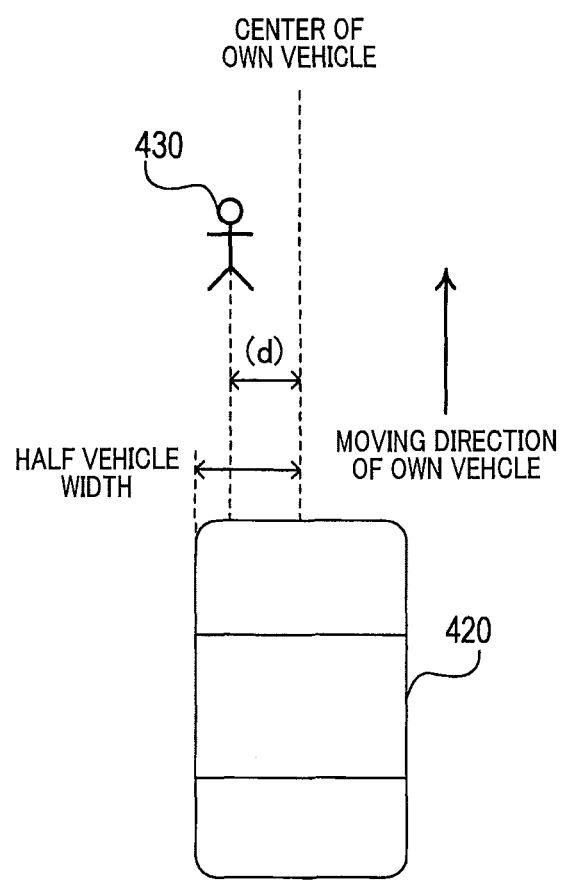
FIG. 6 is a diagram for explaining the term of "offset"
Figure 8:
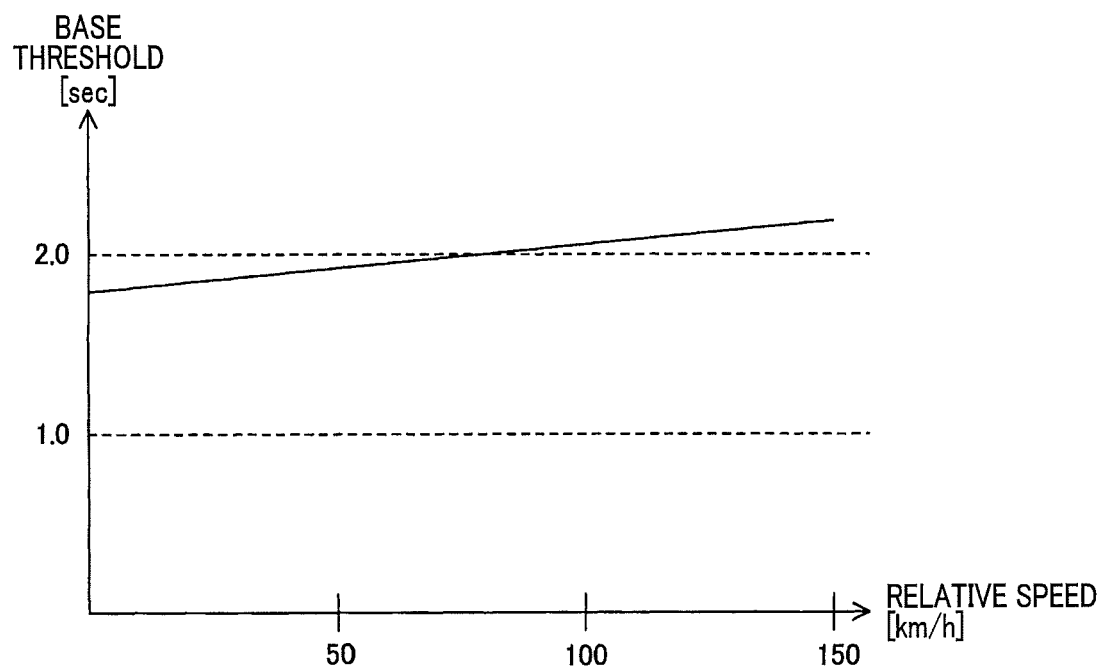
FIG. 8 is a diagram showing an example of a base table.

As shown in FIG. 6, the offset is a degree of lateral deviation between a pedestrian 430 as a collision object and the lateral center of the own vehicle 420. More specifically, the offset may be a ratio of the lateral distance (d) of the lateral center of the own vehicle 420 and the pedestrian 430 to the half of the width of the own vehicle 420.

When a collision object having been detected by the radar sensor 22 is not detected by the camera sensor 21, the kind of the collision object may be determined based on the shape of the collision object recognized by the radar sensor 22, to calculate the lap ratio and offset.

In subsequent step S315, the collision mitigation controller 10 detects the running environment of the own vehicle based on a detection result of the camera sensor 21, radar sensor 22 and so on. More specifically, the collision mitigation controller 10 may detect, as the running environment, a determination result whether the road ahead of the own vehicle is curved or not based on the output of the camera sensor 21 or the radar sensor 22. Also, the collision mitigation controller 10 may detect, as the running environment, a determination result whether the own vehicle or a collision object is inside a white line painted on the road, or whether the own vehicle and the collision object are in the same lane. Further, the collision mitigation controller 10 may detect, as the running environment, a determination result whether the own vehicle is running in a tunnel or not, or the own vehicle is running in what time of day (daytime, evening or night).

In subsequent step S320, the collision mitigation controller 10 includes a timing setting section that sets timing to start each drive assist for each collision object. More specifically, the collision mitigation controller 10 determines the moving direction of each collision object using historical records of relative speed of each collision object, and reads the operation threshold for each collision object and each kind of drive assist from a TTC map storing the operation thresholds for various kinds of collision objects, each of the operation thresholds having different values for different moving directions, different vehicle states, different running environments and different values of the detection reliability (to be explained in detail later).

In subsequent step S325, the collision mitigation controller 10 determines, for each collision object, whether or not the TTC has reached the operation threshold (that is, whether timing to start drive assist has come or not) for each kind of drive assist. If the determination result in step S325 is affirmative, the process proceeds to step S330, and otherwise this process is terminated.

In step S330, the collision mitigation controller 10 controls the control object 30 so that drive assist is started when the timing to start it has come.

Next, the TTC map is explained. As shown in FIG. 7, the TTC map stores the operation thresholds for different kinds of drive assist objects (collision objects), each of the operation thresholds having different values for different levels of the detection reliability, different vehicle states and different running environments.

In this TTC map, the item "STATIONARY OBJECT" means an object at rest on a road. This item is classified into sub-items "VEHICLE" meaning a stationary vehicle, "PEDESTRIAN" meaning a stationary pedestrian, "OTHERS" meaning any stationary object other than a vehicle and a pedestrian, and "CROSSING" meaning an object moving laterally in front of the own vehicle.

The item "PRECEDING OBJECT" means an object present in front of the own vehicle and moving in the same direction as the moving direction of the own vehicle. This item is classified into sub-items "VEHICLE" meaning a preceding vehicle of the own vehicle, and "PEDESTRIAN" meaning a pedestrian walking ahead of the own vehicle.

The item "ONCOMING OBJECT" means an object present in front of the own vehicle and approaching the own vehicle. This item is classified into sub-items "VEHICLE" meaning a vehicle which is in front of the own vehicle and approaching the own vehicle, and "PEDESTRIAN" meaning a pedestrian who is in front of the own vehicle and approaching the own vehicle.

Further, the TTC map includes items "BASE TABLE", "DETECTION RELIABILITY", "VEHICLE STATE" and "RUNNING ENVIRONMENT". The item "BASE TABLE" includes base tables "A-1" to "H-1" provided corresponding to the above described different drive assist objects. Each of these base tables defines a relationship between a base threshold used as a basis for determining the operation threshold and the relative speed of the drive assist object.

To set the start timing, one of these base tables corresponding to the kind of a detected drive assist object (collision object) is selected, and the base threshold is calculated based on the selected base table and the relative speed of the drive assist object.

Figure 9:
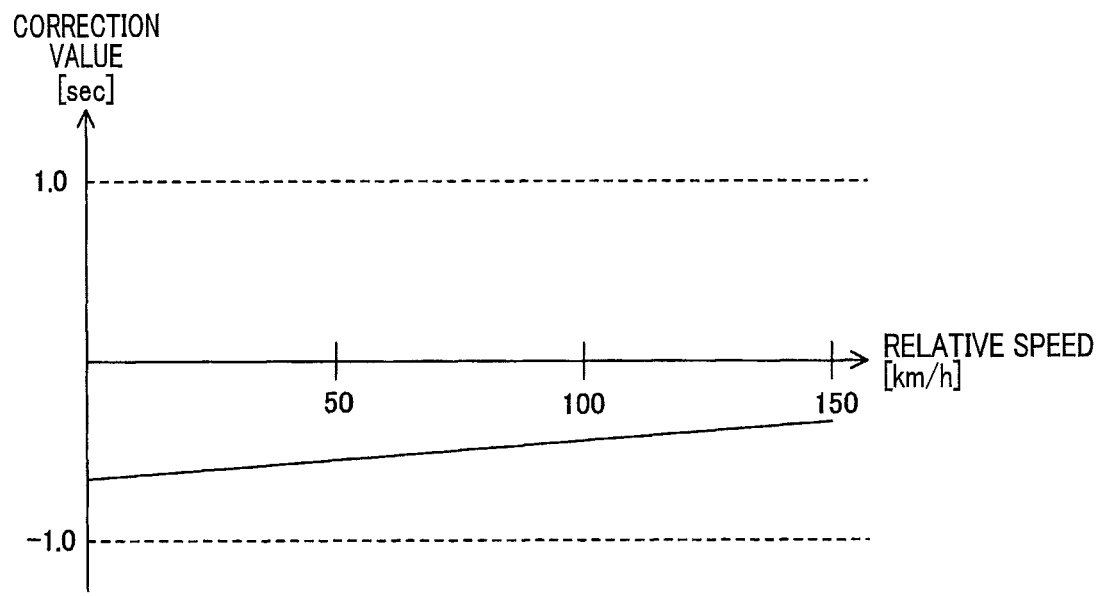
FIG. 9 is a diagram showing an example of a correction table.

Further, the items "DETECTION RELIABILITY", "VEHICLE STATE" and "RUNNING ENVIRONMENT" include correction tables "A-2" to "H-2", "A-12" to "H-12". As shown in FIG. 9, Each of these correction tables shows a relationship between a correction value and the relative speed of a corresponding one of the drive assist objects.

To set the start timing, one or more of the correction tables which corresponds to the present detection reliability, vehicle state, running environment and the kind of the detected drive assist object is selected from the TTC map, and the correction value corresponding to the relative speed is read from the selected correction table. When two or more of the collection tables are selected, the sum of the correction values read from these tables is calculated as a combined correction value.

The operation threshold is calculated to be the sum of the base threshold and the correction value. When two or more of the collection tables are selected, the operation threshold is calculated to be the sum of the base threshold and the combined correction value. More specifically, the item "DETECTION RELIABILITY" is classified into "RELIABILITY RANK 1" to "RELIABILITY RANK 8". One of these sub-items which corresponds to the detection reliability of a detected drive assist object is selected, and the correction table corresponding to the selected sub-item is selected.

As described in the foregoing, the PCS1 is configured to set the operation threshold such that timing to start drive assist is more retarded as the detection reliability is lower. Accordingly, the correction value defined by the correction table corresponding to each of the sub-items "RELIABILITY RANK 1" TO "RELIABILILTY RANK 8" decreases as the value of the detection reliability decreases for the same relative speed.

As shown in FIG. 7, the item "VEHICLE STATE" of the TTC map includes a sub-item "RELATIVE SPEED>=X" which means a vehicle state in which the relative acceleration between the own vehicle and a detected drive assist object is greater than or equal to a predetermined threshold value. When the own vehicle is in such a state, the correction table corresponding to this sub-item and the kind of the drive assist object is selected.

Other than the above described correction tables, correction tables for a state in which the vehicle speed of the own vehicle or the relative speed between the own vehicle and a drive assist object is greater or smaller than a predetermined threshold value, a state in which the blinker is in operation or out of operation, and a state in which the own vehicle is running straight or turning may be provided.

As shown in FIG. 7, the item "RUNNING ENVIRONMENT" of the TTC map is classified into sub-terms "CURVE AHEAD" meaning that the road ahead of the own vehicle is curved and "WHITE LINE RECOGNIZED" meaning that the own vehicle and a detected drive assist object are in the same lane. When the running environment of the own vehicle is the same as any one of these states, a corresponding correction table is selected.

The base tables and correction tables corresponding to the sub-item "VEHICLE" may be prepared so as to define a relationship between the base threshold and the relative speed for each of different values of the lap ratio, or a relationship between the correction value and the relative speed for each of different values of the lap ratio. Further, the base tables and correction tables corresponding to the sub-item "PEDESTRIAN" may be prepared so as to define a relationship between the base threshold and the relative speed for each of different values of the offset, or a relationship between the correction value and the relative speed for each of different values of the offset.

In these cases, the relationship between the base threshold and the relative speed for a given value of the lap ratio with a drive assist object (vehicle), or the relationship between the correction value and the relative speed for a given value of the offset with a drive assist object (pedestrian) may be determined using the selected base table or correction table. Thereafter, the base threshold or correction value may be determined from the determined relationship.

Figure 10:
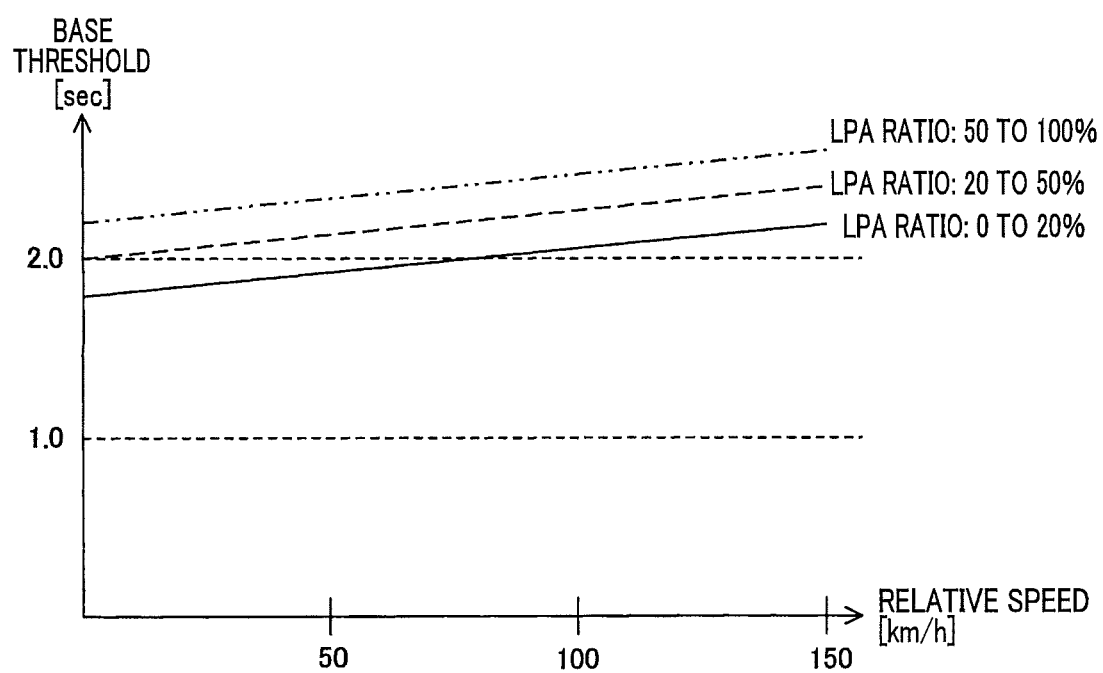
FIG. 10 is a diagram showing an example of a base table which defines base threshold values for each of different values of the lap ratio.

FIG. 10 shows an example of the base table which shows a relationship between the base threshold and the relative speed for each of different ranges of the lap ratio. In the base table of this example, a relationship between the base threshold and the relative speed are defined for each of the lap ratio ranges of 0% to 20%, 20% to 50% and 50% to 100%. According to this base table, since the base threshold decreases with the decrease of the lap ratio for the same relative speed, the start timing is set late when the lap ratio is low compared to when the lap ratio is high.

The TTC map may include a base table which defines a relationship between the base threshold and the relative speed for each of different ranges of the offset. The different ranges of the offset may include a range of 0 to ¼, a range of ¼-½ and a range of ½ to 1, for example.

In this case, the base threshold for a case where the offset is small (or where the distance between a collision object and the lateral center of the own vehicle is small) maybe set large compared to a case where the offset is large (or where the distance between the collision object and the lateral center of the own vehicle is large) for the same relative speed, so that the start timing is set late when the offset is large compared to when the offset is small.

The correction tables corresponding to the sub-item "VEHICLE" may be prepared so as to define the correction values differently for different values of the lap ratio. Likewise, the correction tables corresponding to the sub-item "PEDESTRIAN" may be prepared so as to define the correction values differently for different values of the offset.

The above described embodiment of the present invention provides the following advantages. The PCS 1 of this embodiment sets the TTC for each of detected collision objects based on their relative positions relative to the own vehicle, and performs drive assist if the TTC reaches the operation threshold for each of the respective collision objects. The operation threshold is set in accordance with the detection reliability, vehicle state or running environment for each collision object so that the drive assist start timing can be set appropriately.

When a detected collision object is a vehicle, the operation threshold is set in accordance with the lap ratio between this vehicle and the own vehicle. When a detected collision object is a pedestrian, the operation threshold is set in accordance with the offset between this pedestrian and the own vehicle. Hence, according to this embodiment, it is possible to set the drive assist start timing appropriately depending on the positional relationship between the own vehicle and a detected collision object.

Other Embodiments (1) The PCS 1 of the above embodiment is configured to detect a collision object using both the camera sensor 21 and the radar sensor 22. However, the PCS 1 may be configured to detect a collision object using one of the camera sensor 21 and the radar sensor 22, or using a sensor other than a radar and a camera. The PCS1 may be configured to set timing to start drive assist late when the reliability of a sensor used to detect a collision object is low compared to when it is high.

(2) The PCS1 determines the detection reliability for each detected collision object based on a detection result of the camera sensor 21 or an intensity of the electromagnetic wave received by the radar sensor 22, and sets timing to start drive assist based on the determined detection reliability for each detected collision object.

However, the PCS 1 may be configured to determine the detection reliability collectively for all detected collision objects based on the operation state of the radar sensor 22 or the camera sensor 21, and adjust timing to start drive assist set for each detected collision object based on the determined detection reliability.

(3) The TTC map may be prepared differently for different destinations (regions or countries) where the PCS 1 is used. Further, the TTC map may be prepared differently for different vehicle types or sizes.

The PCS 1 may be configured to select among from different TTC maps in accordance with its destination or type or size of a vehicle using the PCS 1.

Correspondence between the above described embodiment and the claims:

The object detecting section corresponds to steps S100, S105, S115, S120 and S130 of the collision object detecting process. The reliability determining section corresponds to step S135 of the collision object detecting process.

The state detecting section corresponds to step S305 of the drive assist starting process. The object detecting section corresponds to step S310 of the drive assist starting process. The environment detecting section corresponds to step S315 of the drive assist starting process. The timing setting section corresponds to step S320 of the drive assist starting process. The drive assisting section corresponds to step S330 of the drive assist starting process.

The above explained preferred embodiments are exemplary of the invention of the present application which is described solely by the claims appended below. It should be understood that modifications of the preferred embodiments may be made as would occur to one of skill in the art.

What is claimed is:

1. A collision mitigation apparatus comprising:
    an object detecting unit detecting a collision object present in front of an own vehicle on which the collision mitigation apparatus is mounted;
    a drive assisting unit performing drive assist for avoiding a collision between the collision object detected by the object detecting section and the own vehicle, or mitigating damage to the own vehicle due to the collision; and
    a collision mitigation controller including:
        a reliability determining section determining a reliability of a detection result of the object detecting section; and
        a timing setting section setting a start timing to start the drive assist by the drive assisting section in accordance with the reliability determined by the reliability determining section; wherein
        the object detecting unit includes a camera for taking an image in front of the own vehicle and radar for emitting an electromagnetic wave ahead of the own vehicle and receiving a reflected version of the electromagnetic wave, the object detecting section being configured to detect the collision object using at least one of the camera and the radar; and
        the timing setting section sets the start timing to be earlier when an area of an overlapped portion between a radar detection area and a camera detection area is larger than a predetermined value compared to when the overlapped portion is smaller than the predetermined value.

2. The collision mitigation apparatus according to claim 1, wherein the timing setting section sets the start timing to be later when the reliability is low compared to when the reliability is high.

3. The collision mitigation apparatus according to claim 2, wherein the collision controller includes a state detecting section detecting a state of the own vehicle, the timing setting section being configured to set the start timing taking into account the state of the own vehicle detected by the state detecting section.

4. The collision mitigation apparatus according to claim 1, wherein the object detecting section detects a positional relationship between the own vehicle and the collision object, the timing setting section being configured to set the start timing taking into account the positional relationship detected by the object detecting section.

5. The collision mitigation apparatus according to claim 4, wherein the object detecting section detects a lateral positional relationship between the own vehicle and the collision object and a lateral length of the collision object, the timing setting section being configured to set the start timing taking into account the lateral positional relationship and the lateral length of the collision object detected by the object detecting section.

6. The collision mitigation apparatus according to claim 1, further comprising an environment detecting section detecting an environment of the own vehicle, the timing setting section being configured to set the start timing taking into account further the environment of the own vehicle detected by the environment detecting section.

7. The collision mitigation apparatus according to claim 1, wherein the timing setting section sets the start timing to be earlier when the reliability of the detection result is higher.

8. The collision mitigation apparatus according to claim 1, wherein:
    the reliability of the detection result is ranked from 1 to X, where X is a number greater than 1; and the reliability ranking of 1 is the highest reliability of the detection result and the reliability of the detection result continuously decreases as the reliability ranking moves from 1 to X.

9. The collision mitigation apparatus according to claim 8, wherein the timing setting section sets the start timing to be earlier when the reliability ranking is 1 as compared with a reliability ranking of 2.

10. The collision mitigation apparatus according to claim 8, wherein the timing setting section sets the start timing to be earlier when the reliability ranking is 1 as compared with a reliability ranking of 3.

11. The collision mitigation apparatus according to claim 8, wherein the timing setting section sets the start timing to be earlier when the reliability ranking is 1 as compared with a reliability ranking of 4.

12. The collision mitigation apparatus according to claim 8, wherein the timing setting section sets the start timing to be earlier when the reliability ranking is 1 as compared with a reliability ranking of 5.

13. The collision mitigation apparatus according to claim 8, wherein the timing setting section sets the start timing to be earlier when the reliability ranking is 1 as compared with a reliability ranking of 6.

14. The collision mitigation apparatus according to claim 8, wherein the timing setting section sets the start timing to be earlier when the reliability ranking is 1 as compared with a reliability ranking of 7.

* * * * *